F. FAVATA.
HELICOIDAL PROPELLER AND METHOD OF PRODUCING THE SAME.
APPLICATION FILED DEC. 28, 1909.
1,034,773.
Patented Aug. 6, 1912.
2 SHEETS—SHEET 1.
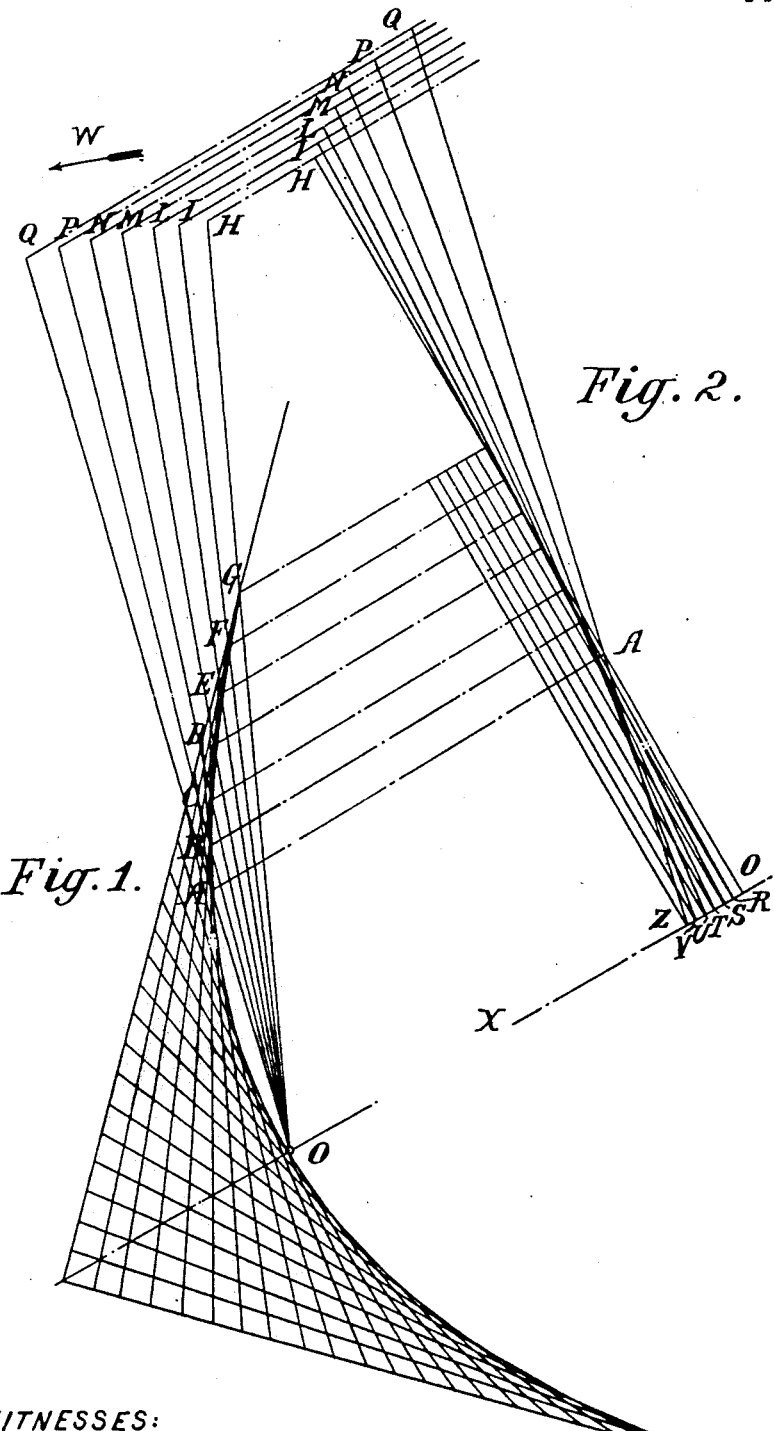
WITNESSES:
INVENTOR: Francesco Favata,
By Attorneys,

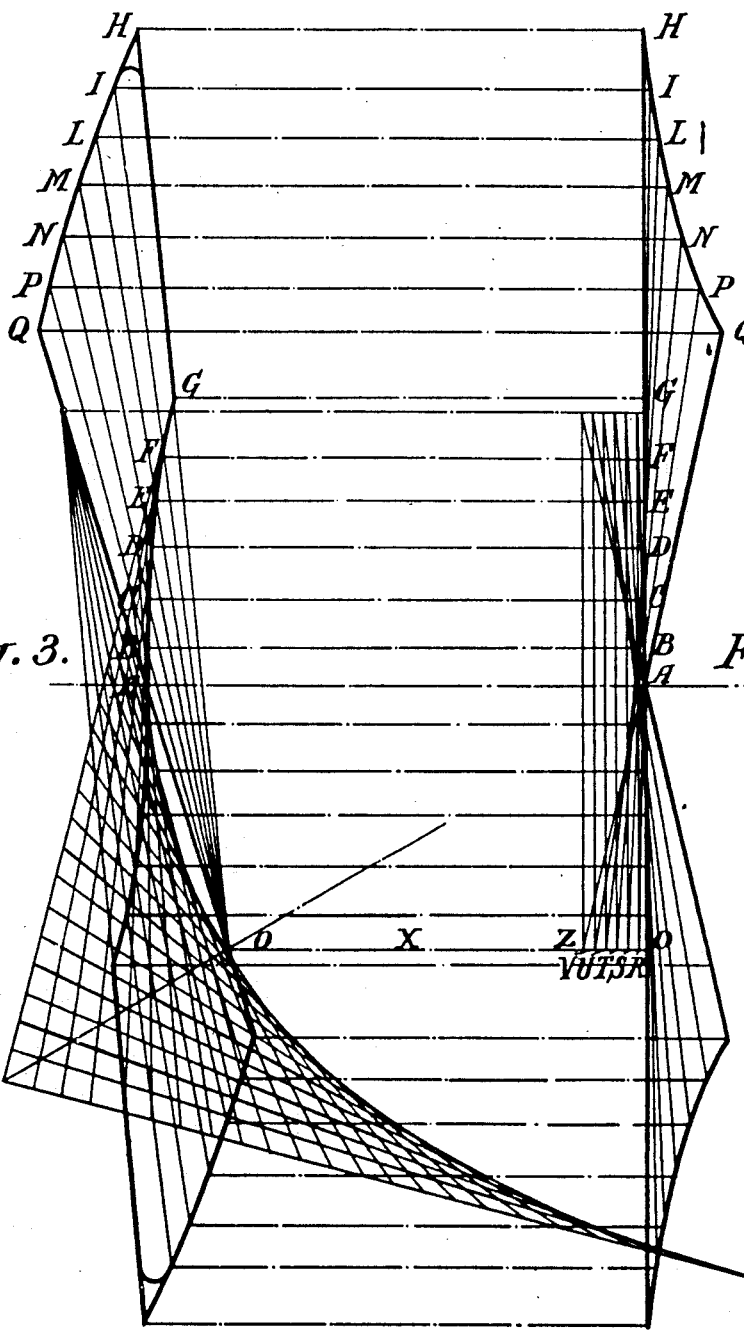

UNITED STATES PATENT OFFICE.

FRANCESCO FAVATA, OF LONDON, ENGLAND, ASSIGNOR TO EDGAR COHEN, OF LONDON, ENGLAND.

HELICOIDAL PROPELLER AND METHOD OF PRODUCING THE SAME.

1,034,773. Specification of Letters Patent. Patented Aug. 6, 1912.

Application filed December 28, 1909. Serial No. 535,325.

*To all whom it may concern:*

Be it known that I, FRANCESCO FAVATA, of 15 and 16 Cockspur street, London, England, engineer, have invented certain Improvements in Helicoidal Propellers and Methods of Producing the Same, of which the following is a specification.

The object of the present invention is to provide a helicoidal propeller or screw adapted to obviate disadvantages connected with the action of existing screw propellers, to increase the efficiency of propulsion or thrust, and to reduce the resistances which, with ordinary propellers, absorb a large amount of motive power and reduce efficiency. With this object I have devised a propeller or screw having a novel type of helicoidal surface which surface imparts to the propeller or screw special and characteristic properties. This new helicoidal surface is derived from a double-helicoidal surface which may be generated by a straight line, a curved line, or a combined straight and curved line, according to the particular object to be attained. The surface is generated by the rotation of this generatrix about an axis which generatrix at the same time moves along said axis while at the same time said generatrix is applied constantly upon a guiding line contained in a plane perpendicular (or more or less inclined relatively) to the plane of the axis upon which the generatrix rotates. In this way a double helicoidal surface is traced out, the generating line being guided by the guide line and rotating about its axis or center of rotation, at the same time moving along its axis or line of displacement. The movement of the generatrix along its axis or line of displacement traces what I call the pitch of origin and the direction of pitch of this "pitch of origin" is in the opposite direction to the pitch of the part of the helicoidal surface on the outside of the guide line, which surface forms the active surface of the propeller to be formed.

In order to illustrate the manner in which the surface is generated, reference will be had to the accompanying drawings, wherein—

Figures 1 and 2 illustrate diagrammatically a development of the lines of one blade of my propeller, Fig. 2 being a projection of Fig. 1 in a plane perpendicular thereto, and Figs. 3 and 4 illustrate diagrammatically a development according to the plan of Figs. 1 and 2 of a two-blade propeller, Fig. 4 being a projection of Fig. 3 in a plane perpendicular thereto.

I will assume by way of example that the generating line or radius is a straight line OH, Fig. 1 of the accompanying drawings, that the guide line, or line of application, is a parabola YOAG, and that the center O of the generating radius moves in a straight line OX perpendicular to the plane of the paper, Fig. 1 and perpendicular to the plane of the guide line, that is to say to the plane of the parabola YOAG. The generating radius OH is first applied at two points of the guide-line or parabola, say O and G. Consequently this radius now coincides with the plane of the parabola or of the guide line. The foot O of the axis or line OX always coincides with the center of the generating radius at the commencement of its movement. The foot O of the axis or line OX might be at any point outside or upon the guide line, and the axis or line of displacement OX might be any line whatever, even a helicoidal line, according to the object in view. From the center O there is taken on the line OX a section OZ, which is the particular "pitch of origin" of the helicoidal surface considered. The helicoidal surface is now generated with the generating radius OH as follows:—The generating radius is moved around the axis or center O in the direction of the arrow W for example, and at the same time the generating radius is moved along the axis or line of displacement OX keeping the generating radius always applied to the guide line YOAG the rate of movement of the generating radius on the guide line being preferably proportional to its rate of movement on its "pitch of origin." By taking successive positions, OH, OI, OL, OM, ON, OP, OQ, ... of the generating radius, which are represented in projection in Fig. 2 by OH, RI, SL, TM, UN, VP, ZQ, ... I obtain the above mentioned double helicoidal surface, with a "pitch of origin" OZ (Fig. 2) opposite in direction to the pitch of the part of the helicoidal surface AQHG, (Fig. 1) forming the active surface of the propeller to be formed and which has an angular development determined by the angle formed by the two positions OH, OQ, of the generating radius.

It will be seen that the helicoidal surface as a whole has two developments contrary and inverse in a plane perpendicular to the plane of the guide line YAOG, that is to say the portion of the surface upon one side of the guide line YAOG has a helicoidal development inverse to the portion of the helicoidal surface located on the other side of said guide line. It will further be observed that for any position of the generating radius, for example the position OAQ (Fig. 1) which is represented in projection by ZAQ in Fig. 2, the pitch of the surface OZAG varies gradually from OZ and diminishes to zero at the point where the generating radius coincides with the plane of the guide line and which in Fig. 2 corresponds to the point A; but that on the other side of the plane of the guide line it starts from zero and increases progressively along the generating radius from this point of contact A outward. Consequently the pitch of the exterior helicoidal surface increases progressively outwardly along the generating radius. Finally it will be observed that the pitch of the helicoidal surface AQHG increases progressively with the angular displacement of the generating radius, for during this movement the center of the radius moves out of the plane of the guide line along its axis. It will be seen therefore that the pitch of the helicoidal surface considered (AQHG) increases in all directions. In order to apply this new type of surface to the construction of helicoidal propellers for marine and aerial navigation for example, it is only necessary to take a segment of the helicoidal surface AQHG.

Referring to Fig. 3 it will be seen that a propeller blade or wing is here represented by the segment of the helicoidal surface AQHG, where the point A is the extreme point of the blade corresponding to the center of rotation of the propeller. This center does not, however, correspond to the center of origin of the helicoidal surface, which point is the point O. The generating radius OQ is diminished by the portion of the line comprised between the generating center O and the point of application of the generating radius on the guide line In a propeller constructed in accordance with the present plan the edge of the propeller corresponding to the generating radius OQ may be tangential to the external circumference of the boss. By thus displacing the point of origin relatively to the point which is to be the axis of the propeller and reducing the absolute generating radius of the helicoidal surface to that portion which lies beyond the point of contact of the generating radius with the guide line, it is possible to obtain a smaller radius for the blade of the propeller and to secure the advantage of providing an entirely active thrust surface and of eliminating the central portion of the blade which in the known construction produces a vortex or eddy which increases the resistance and reduces efficiency. This decentralizing allows of constructing a propeller with a very small boss, leaving the entire helicoidal surface active. It also allows of obtaining an area of thrust greater than the area resulting from the radius of the blade. Owing to the axis of the propeller or screw not coinciding with the center of the generating radius the vortex created by the propeller acting in its medium is not formed at the center of the propeller but at the center of the generating radius O.

Owing to the principle on which it is constructed the helicoidal surface AQHG hereinbefore described has a pitch which increases progressively in all directions from the origin. This secures the advantage that the propeller blades always have a complete active grip of the medium in which they work and are also enabled to utilize, for the efficiency of the propeller, the lateral velocity of the said medium produced by the centrifugal force due to the motion of the propeller. Such progressively increasing inclination of the helicoidal surface has moreover the advantage of avoiding rarefaction of the medium on the thrust face of the blade. Each blade or wing possesses its own center of action upon the medium while existing propellers have only one center, the center of the propeller itself. Each center of action of the blades or wings of the present invention corresponds to the center of the absolute generating radius of the blade itself.

The extreme contour or outer edge HILMNPQ of the blade is determined according to the speed at which the propeller is intended to work, the medium in which it is to run, and so forth. In Fig. 3, the external contour is parabolic and Fig. 4 is its projection looking at it in a plane perpendicular to the plane of Fig. 3.

What I claim and desire to secure by Letters Patent is:—

1. A helicoidal propeller or screw, comprising a helicoidal surface having a pitch which increases in all directions from the origin and having a pitch of origin in a direction opposite to its pitch.

2. A helicoidal propeller or screw, comprising a helicoidal surface having a pitch which increases in all directions from the origin and having a pitch of origin in a direction opposite to its pitch, each blade having its own center of action.

3. A helicoidal propeller or screw, comprising a helicoidal surface having a pitch which increases in all directions from the origin, and having a pitch of origin in a direction opposite to its pitch, said surface being the outer portion of a double helicoidal surface generated by the rotation of a generating line around and along an axis or line of displacement, this generatrix being at the same time applied constantly upon a guiding line contained in a plane perpendicular or inclined relatively to a plane of the axis upon which the generatrix rotates, substantially as described.

4. A helicoidal propeller or screw, comprising a helicoidal surface having a pitch which increases in all directions from the origin, and having a pitch of origin in a direction opposite to its pitch, said surface being the outer portion of a double helicoidal surface obtained by the rotation of a line about a point moving in a line in a plane perpendicular or inclined to the plane of a guiding line to which latter the generatrix is constantly applied during its rotation.

5. In a helicoidal propeller or screw a blade or wing having a helicoidal surface the pitch of which increases in all directions from the origin and having a pitch of origin in a direction opposite to its pitch said helicoidal surface being displaced relatively to the axis of the propeller or screw substantially as and for the purposes described.

6. In a helicoidal propeller or screw a blade or wing having a helicoidal surface the pitch of which increases in all directions from the origin and having a pitch of origin in a direction opposite to its pitch said helicoidal surface being displaced relatively to the axis of the propeller or screw and each blade or wing having its own center of action.

7. In a helicoidal propeller or screw a blade or wing having a helicoidal surface the pitch of which increases in all directions from the origin and having a pitch of origin in a direction opposite to its pitch, said surface being the outer portion of a double helicoidal surface generated by the rotation of a generating line around and along an axis or line of displacement, this generatrix being at the same time applied constantly upon a guiding line contained in a plane perpendicular or inclined relatively to the plane of the axis upon which the generatrix rotates, and said helicoidal surface being displaced relatively to the axis of the propeller or screw, substantially as and for the purposes described.

In witness whereof, I have hereunto signed my name in the presence of two subscribing witnesses.

FRANCESCO FAVATA.

Witnesses:
   D. ROBERTO DE SIMONE,
   HENRY ALLEN PRYER.

---

Copies of this patent may be obtained for five cents each, by addressing the "Commissioner of Patents, Washington, D. C."